(12) United States Patent
Novikov

(10) Patent No.: US 12,536,286 B2
(45) Date of Patent: Jan. 27, 2026

(54) STATEFUL API ATTACKS DETECTION

(71) Applicant: Wallarm Inc., San Francisco, CA (US)

(72) Inventor: Ivan Novikov, San Francisco, CA (US)

(73) Assignee: Wallarm Inc., San Francisco, CA (US)

( * ) Notice: Subject to any disclaimer, the term of this patent is extended or adjusted under 35 U.S.C. 154(b) by 0 days.

(21) Appl. No.: 19/228,045

(22) Filed: Jun. 4, 2025

(65) Prior Publication Data

US 2025/0378165 A1 Dec. 11, 2025

Related U.S. Application Data

(60) Provisional application No. 63/658,050, filed on Jun. 10, 2024, provisional application No. 63/656,543, filed on Jun. 5, 2024.

(51) Int. Cl.
*G06F 21/00* (2013.01)
*G06F 21/56* (2013.01)

(52) U.S. Cl.
CPC ...... *G06F 21/566* (2013.01); *G06F 2221/034* (2013.01)

(58) Field of Classification Search
CPC ...... G06F 21/554; G06F 30/27; G06F 21/566; G06F 21/577; G06F 21/563
See application file for complete search history.

(56) References Cited

U.S. PATENT DOCUMENTS

| | | | |
|---|---|---|---|
| 10,917,401 B1 * | 2/2021 | Mantin | H04L 63/1441 |
| 2019/0179736 A1 * | 6/2019 | Sharma | G06F 11/3644 |
| 2023/0262086 A1 * | 8/2023 | Connors | G06F 21/577 726/25 |
| 2024/0195820 A1 * | 6/2024 | Wang | H04L 63/1425 |
| 2024/0291863 A1 * | 8/2024 | Cohen | H04L 63/1425 |
| 2024/0430282 A1 * | 12/2024 | Wang | H04L 63/1425 |
| 2025/0202919 A1 * | 6/2025 | Nagaraj | H04L 63/1425 |

* cited by examiner

*Primary Examiner* — Tri M Tran
(74) *Attorney, Agent, or Firm* — Ascenda Law Group, PC

(57) ABSTRACT

A method for detecting stateful application programming interface (API) attacks. The method may include analyzing, based on API state detection rules, API responses to detect API states within API sessions, wherein the API state detection rules encompass endpoint universal resource locators (URLs) and data extraction pathways; extracting, based on extraction rules, one or more of session identifiers or tokens from API calls through criteria including one or more of API request headers or JavaScript Object Notation (JSON) Web Token (JWT) parameters; determining stateful API attacks detection rules based on the detected API states and the extracted one or more of the session identifiers or tokens; and continuously monitoring state transitions and actions within the API sessions based on the stateful API attacks detection rules so as to detect stateful API attacks.

18 Claims, 2 Drawing Sheets

STATEFUL API ATTACKS DETECTION

RELATED APPLICATIONS

This application is a non-provisional patent application of and claims priority to U.S. Provisional Application No. 63/656,543, filed 5 Jun. 2024, and U.S. Provisional Application No. 63/658,050, filed 10 Jun. 2024, both of which are incorporated herein by reference in their respective entireties.

FIELD OF THE INVENTION

The present invention relates to a stateful approach for detecting API (Application Programming Interface) attacks by continuously monitoring state transitions and actions within an API session.

BACKGROUND

APIs (Application Programming Interface) are used for data transfer and communications almost everywhere, including websites using SPA (Single Page Application) technologies, IoT (Internet of Things) devices, smart cities, mobile applications, infrastructure management layers such as Kubernetes, critical infrastructure, and so on. Securing APIs are an important task for information security processes and controls.

This task has many challenges, and one of them is related to so-called "business logic;" that is, the monitoring and controlling of different incoming requests (API calls) depending on the state in which a securing API (backend) is currently in for a current user (session).

Current solutions for API attack prevention are based on signatures, and/or behavioral thresholds, including methods of detecting malicious requests (API calls) independently from the state of the business logic of API backends.

SUMMARY OF THE INVENTION

In accordance with one embodiment of the invention, stateful application programming interface (API) attacks are detected by analyzing, based on API state detection rules, API responses to detect API states within API sessions, wherein the API state detection rules encompass endpoint universal resource locators (URLs) and data extraction pathways, thereby facilitating an extraction of metadata defining the respective API state for a user session; extracting, based on extraction rules, one or more of session identifiers or tokens from API calls through criteria including one or more of request headers or JavaScript Object Notation (JSON) Web Token (JWT) parameters; determining stateful API attacks detection rules based on the detected API states and the extracted one or more of the session identifiers or tokens; and continuously monitoring state transitions and actions within the API sessions based on the stateful API attacks detection rules so as to detect stateful API attacks.

These and other embodiments of the invention are more fully described in association with the drawings below.

BRIEF DESCRIPTION OF THE DRAWINGS

The invention is now described, by way of example and without limiting the scope of the invention, with reference to the accompanying drawings which illustrate embodiments of it, in which.

DETAILED DESCRIPTION OF THE INVENTION

Figure 1:
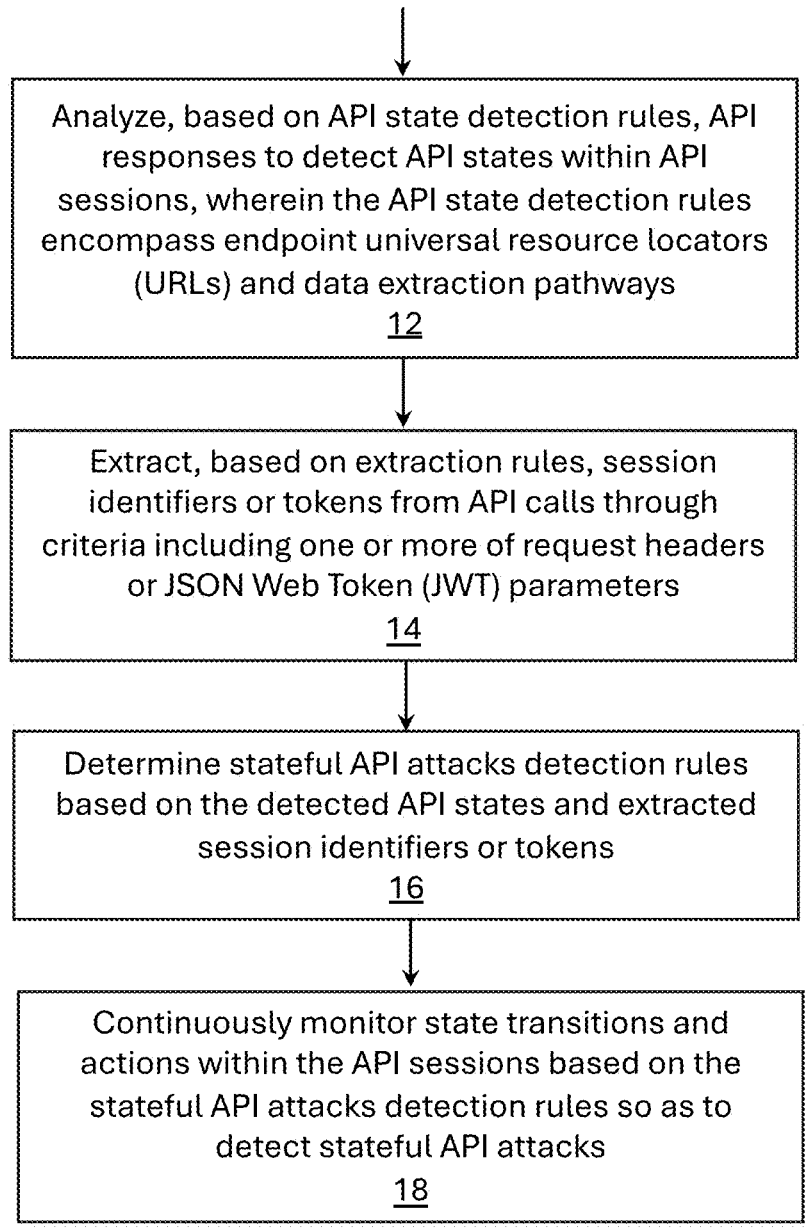
FIG. 1 depicts a flow diagram for detecting stateful application programming interface (API) attacks, in accordance with one embodiment of the invention.

The present invention provides a new approach to address stateful API monitoring and protection, including real-time and asynchronous modes. The proposed approach allows detection and blocking of malicious API attacks that cannot be detected by stateless methods, including signatures, or behavioral methods without a feedback loop from an API backend to discover an actual state of its business logic. Embodiments of the present invention find application in API security solutions, WAAP (Web Application and API Prevention), IPS/IDS (Intrusion Prevention and Detection Systems), and other cybersecurity tools. Implementations of the present invention for stateful API security also include API security testing, explained in further below. This is applicable for solutions such as DAST, IAST, and other API/Application security testing technologies, including fuzzers.

Stateful API attacks leverage the current state of an API session to bypass security measures. Traditional stateless detection methods often fail against these sophisticated attacks as they do not consider the context and state of the session. Below, we outline the stateful approach for detecting such attacks by continuously monitoring the state transitions and actions within an API session.

Part 1. Stateful API Attacks Detection

In one embodiment, the present method involves analyzing API responses against predefined rules to detect API states within API user sessions. These rules encompass criteria such as endpoint URLs and data extraction pathways, facilitating the extraction of metadata defining the API state for a given user. Efficient extraction of session identifiers or tokens from API calls is achieved through specific criteria such as request headers or JSON Web Token (JWT) parameters. Additionally, rules for extracting data from API backend responses extend the analysis beyond authentication stages, enhancing the depth of API state understanding. The culmination of these processes results in Stateful API Attacks Detection Rules, which strengthen API security by leveraging API states and session identifiers to preempt unauthorized access and vulnerabilities such as Broken Object Level Authorization (BOLA). All the suggested rules are built with a large language model (LLM) compatibility and methods of its generation also explained.

In one embodiment of the invention, four types of rules can be utilized interchangeably; their application depending on the intricacies of the API business logic. API States Detection Rules serve as a foundational framework, analyzing API responses to define the API state for specific user sessions. Following this, API Users Sessions Extraction Rules streamline the extraction of session identifiers or tokens from API calls, enhancing the efficiency of session management. Subsequently, API States Data Extraction Rules broaden the scope by extracting relevant data from API backend responses, enriching the understanding of API states beyond authentication stages. Finally, Stateful API Attacks Detection Rules leverage the amalgamation of API states and session identifiers to fortify API security, preempting unauthorized access and vulnerabilities in alignment with the API's unique business logic.

API States Detection Rules: In embodiments of the present method, API states for specific user sessions are discovered, for example, by checking API (backend) responses and matching them with the predefined set of matching and data/values extraction rules.

In the simplest case, these rules are a set of API endpoint URLs and data extraction criteria, such as response JSON parameters paths, followed by the meta-data that describes this state of a particular API for a particular user.

Example 1. Authenticated User API State Rule (Pseudocode)

```
If API_endpoint is "/user/authentication":
   If API_response_JSON contains JSON_PATH(user->authenticated):
      API_Session->id = API_response_JSON->user->session_id
      API_Session->role = API_response_JSON->user->role
      API_Session->status = API_response_JSON->user->authenticated,
      API_Session->STATE = "authenticated" //meta-data for further
      using
      ...
```

Such rules represent sets of formal matching and data extraction sub-rules and can be interpreted by any LLM as native language text with no loss of meaning.

API Users Sessions Extraction Rules (Requests): Once the API session identifier or token is set up by the API State Extraction Rule, it may be used to find all matching requests by finding such data in it "as-is."

However, due to performance optimizations (linear search for all the parameters is not optimal), and potential custom data encryption (such as JWT with data encryption), custom encodings, and similar reasons, it is also beneficial to define specific rules of extracting API user sessions. These API Users Sessions Extraction Rules help to get session identifiers from API calls (requests) without searching for data of known API session identifiers.

In the simplest case, these rules are a set of data extraction criteria, such as API request headers, or a JWT parameters path, followed by the meta-data that describes this state of a particular API for a particular user.

Example 2. API Session Extraction Rule for OAuth 2.0 Access Token

```
If API_request_HEADERS contains "Authorization":
   API_Request_Session->id =
   API_request_HEADERS->Authorization- >Bearer
```

It is important to note at this point that using requests (API calls) data is dangerous and can be used only to find corresponding API backend state. However, in some cases such as signed or encrypted JWT tokens, it might be possible to use data from API requests directly to get API backend states.

Such rules represent sets of formal matching and data extraction sub-rules and can be interpreted by any LLM as native language text with no loss of meaning.

API States Data Extraction Rules (Responses): To address the complex task of stateful API attacks detection, detection rules should use API data from different states, not only at the stage of authentication. To address this, embodiments of the present invention use a separate rules for data extraction that might be used for API state once a session key or token is defined.

These rules may be included in other rules or may be used separately. Unlike API sessions extraction rules for API Requests, these rules only cover API backend responses to extract data sent by an API to its users.

A simple example of such rules involves the extraction of item identifiers allowed to a current API session:

Example 3. API State Data Extraction Rule for Allowed Items Ids (Pseudocode)

```
If API_request_URL is "/items/":
   API_Request_Session->allowed_objects = API_response_JSON-
   >items["id"]
```

Stateful API Attacks Detection Rules: Having API states data connected with API session identifiers such as tokens and keys allows creating stateful API attacks detection rules using a similar approach. Such rules can cover all possible scenarios of API business logic once their states are defined correctly.

Some common scenarios are presented here as examples.

Example 4 provides a rule designed to detect and prevent unauthorized access to administrative endpoints in an API. The focus is on ensuring that only users with the appropriate role (in this case, "admin") can access URLs intended for administrative functions. This rule checks the role of a user associated with a current session before allowing access to sensitive endpoints.

Example 4. Unauthorized Role Access Detection Rule

```
If API_request_URL contains "/admin/":
   If API_session.getById(API_Request_Session->id)->role != "admin":
      RaiseAlert("Wrong API User Role Request Alert")
      BlockRequest( )
```

Example 5 concerns Broken Object Level Authorization (BOLA) vulnerabilities, which occur when an application does not properly enforce access control to specific objects, allowing users to access objects they should not have access to. Detecting and mitigating BOLA vulnerabilities involves ensuring that each API request is checked against the allowed object IDs for an authenticated user.

Example 5. BOLA (Broken Object Level Authorization) Detection Rule

```
If API_request_URL contains "/resource/":
   If API_session.getById(API_Request_Session->id)->allowed_objects
   not contains API_request_JSON->ObjectID:
      RaiseAlert("BOLA Attempt Detected by Using ObjectID outside
      of the current API Session")
      BlockRequest( )
```

Part 2. Stateful API Security Testing

API States Detection Rules, as well as Stateful Data Extraction Rules (responses), and User Sessions Extraction Rules (requests) are also useful for Stateful API Security Testing scenarios, made in a similar manner as Stateful API Attacks Detection Rules. Such tests could be created manually by QA (Quality Assurance), Application/API Security teams, or other functional roles responsible for testing or security. At the same time, similar tests using the present methods aim to be automated by LLMs (so-called LLM-native approach) since it is using a formal language that LLMs interpret. A simple example of such tests for BOLA (Broken Object Level Authorization) is presented here for reference:

Example 6. BOLA (Broken Object Level Authorization) API Security Testing Rule

```
Session = API_session.new( )
Max_Object_ID = Session->allowed_objects.max( )
Testing_Object_ID = Max_Object_ID + 1
Object_Response = Session.sendJSON("resource/{Testing_Object_ID}")
If (Object_Response->Status):
    RaiseAlert("BOLD Detected at {Testing_Object_ID} for session {Session->id}")
```

Using such an integrated approach with API Security Testing Rules relies on functions/rules (in Example 6, it is new ( ) and allowed_objects functions referring to Stateful API Rules created before) defined by Stateful API Attacks Detection Rules simplifies testing creation, automation (such as LLM-based test producing), and visibility of such tests.

Part 3. Leveraging Large Language Models (LLMs) for Stateful API Attacks Detection and Security Testing Large Language Models (LLMs) like GPT-4 can transform the way we detect and prevent stateful API attacks. These models can process and understand natural language, making them ideal for generating complex, context-aware rules for API security. One example of how they can be utilized is:

1. LLMs can generate rules by analyzing input data such as API specifications, traffic patterns, and logs. By understanding the natural language descriptions of API states, session behaviors, and attack scenarios, LLMs can create formalized detection and extraction rules. These rules help identify specific API states and session behaviors, providing a robust mechanism for attack detection.
2. For security testing, LLMs can automate the creation of tests based on API documentation, past attack data, and logs of detected vulnerabilities. This ensures that the API can withstand different attack vectors and that security measures are effectively implemented. The continuous learning capability of LLMs allows them to update and refine rules over time, adapting to new and emerging threats. By analyzing continuous feedback from logs, traffic patterns, and API usage metrics, LLMs improve the accuracy of detection mechanisms and reduce false positives.

Data Required for Implementation: To effectively use LLMs for stateful API attacks detection and security testing, several types of data are needed:

1. API Documentation: Detailed descriptions of API endpoints, parameters, response formats, and authentication mechanisms. This information is crucial for defining the initial set of rules for detection and testing.
2. Historical Attack Data: Logs and examples of past attacks, including details on how they bypassed existing security measures. This data helps in understanding attack patterns and crafting specific detection rules.
3. Session and State Information: Metadata about user sessions, state transitions, and context-specific behaviors. This information is essential for creating rules that consider the stateful nature of API interactions.
4. Security Policies: Definitions of what constitutes legitimate versus malicious activity for the specific API. These policies guide the creation of rules and the parameters for security testing.
5. Real-Time Traffic Analysis: Monitoring of live API traffic to gather data on current usage patterns, which helps in identifying anomalies and potential attack vectors.
6. Source Code: Access to the API's source code provides a deeper understanding of the internal logic and potential vulnerabilities. This insight is crucial for crafting effective detection rules and security tests.

Example Implementation

Step 1: Define Rules with LLM: Using LLMs, one defines rules for detecting API states and extracting session information. For instance, an API state detection rule can be created to identify whether or not a user is authenticated by specifying the expected response structure from an authentication endpoint.

Example 7: API State Detection Rule (Pseudocode)

```
If API_endpoint is "/user/authentication":
    If API_response_JSON contains JSON_PATH(user->authenticated):
        API_Session->id = API_response_JSON->user->session_id
        API_Session->role = API_response_JSON->user->role
        API_Session->status = API_response_JSON->user->authenticated
        API_Session->STATE = "authenticated"
```

Similarly, a session extraction rule can be defined to pull Open Authorization (OAuth) tokens from API request headers:

Example 8: Session Extraction Rule (Pseudocode)

```
If API_request_HEADERS contains "Authorization":
    API_Request_Session->id =
    API_request_HEADERS->Authorization->Bearer
```

Step 2: Implement Rule Application: To apply these rules, set up an API monitoring service that intercepts and logs API requests and responses. Use the generated rules to analyze each request and response for identifying session states and extracting relevant data.

Example 9: Detect Authenticated User and Extract Session IDs (Pseudocode)

```
Function detect_authenticated_user(API_endpoint, api_response_json):
    If API_endpoint == "/user/authentication":
        If 'user' in API _response_json and 'authenticated' in
        API_response_json['user']:
            session_id = API _response_json['user']['session_id']
            role = API_response_json['user']['role']
            status = API_response_json['user']['authenticated']
            state = "authenticated"
            Return {
                "session_id": session_id,
                "role": role,
                "status": status,
                "state": state
            }
    Return None
Function extract_session_id(API _request_headers):
    If 'Authorization' in API_request_headers:
        token = API _request_headers['Authorization'].split(' ')[1]
        Return token
    Return None
```

Step 3: Security Testing Automation: For security testing, LLMs can generate test cases that simulate various attack scenarios. For example, to test for Broken Object Level Authorization (BOLA) vulnerabilities, the LLM can create a rule that simulates unauthorized access attempts:

Example 10: BOLA (Broken Object Level Authorization) Testing Rule (Pseudocode)

```
Session = API_session.new( )
Max_Object_ID = Session->allowed_objects.max( )
Testing_Object_ID = Max_Object_ID + 1
Object_Response = Session.sendJSON("resource/{Testing_Object_ID}")
If (Object_Response->Status):
    RaiseAlert("BOLA Detected at {Testing_Object_ID} for session {Session->id}")
```

Execute these tests using a testing framework, logging and analyzing the results to identify and address vulnerabilities.

Example 11: Testing BOLA Vulnerabilities (Pseudocode)

```
Function test_bola_vulnerability(session):
    max_object_id = max(session.allowed_objects)
    testing_object_id = max_object_id + 1
    response = session.send_json(f"resource/{testing_object_id}")
    If response.status:
        raise_alert(f"BOLA Detected at {testing_object_id} for session {session.id}")
# Assuming 'session' is a pre-defined object with necessary methods
test_bola_vulnerability(session)
```

Feedback Loops for Continuous Improvement: Implementing feedback loops is crucial for continuous improvement in API security. One example of such a process is:
1. Log Analysis: Continuously analyze logs of detected attacks, false positives, and legitimate traffic to refine the rules and improve detection accuracy.
2. Real-Time Monitoring: Monitor API traffic in real-time to identify new patterns and anomalies. Update the rules based on these observations to stay ahead of emerging threats.
3. User Feedback: Collect feedback from users and security teams about false positives and missed detections. Use this feedback to fine-tune the rules and improve their effectiveness.
4. Automated Rule Updates: Use LLMs to automatically generate and update rules based on new data inputs. This ensures that the detection mechanisms are always up-to-date with the latest threat intelligence.

By leveraging LLMs, organizations can create a dynamic and adaptive security framework that evolves with the changing threat landscape, providing robust protection against stateful API attacks.

FIG. 1 depicts a flow diagram 10 of a process for detecting stateful application programming interface (API) attacks. In step 12, a computer system may analyze, based on API state detection rules, API responses to detect API states within API sessions, wherein the API state detection rules encompass endpoint universal resource locators (URLs) and data extraction pathways. Such analysis may facilitate extraction of metadata defining the API state for specific user sessions. In step 14, the computer system may extract, based on extraction rules, one or more of session identifiers or tokens from API calls through criteria including one or more of API request headers or JWT parameters. In step 16, the computer system may determine stateful API attacks detection rules based on the detected API states and the extracted one or more of the session identifiers or tokens. In step 18, the computer system may continuously monitor state transitions and actions within the API sessions based on the stateful API attacks detection rules so as to detect stateful API attacks.

Figure 2:
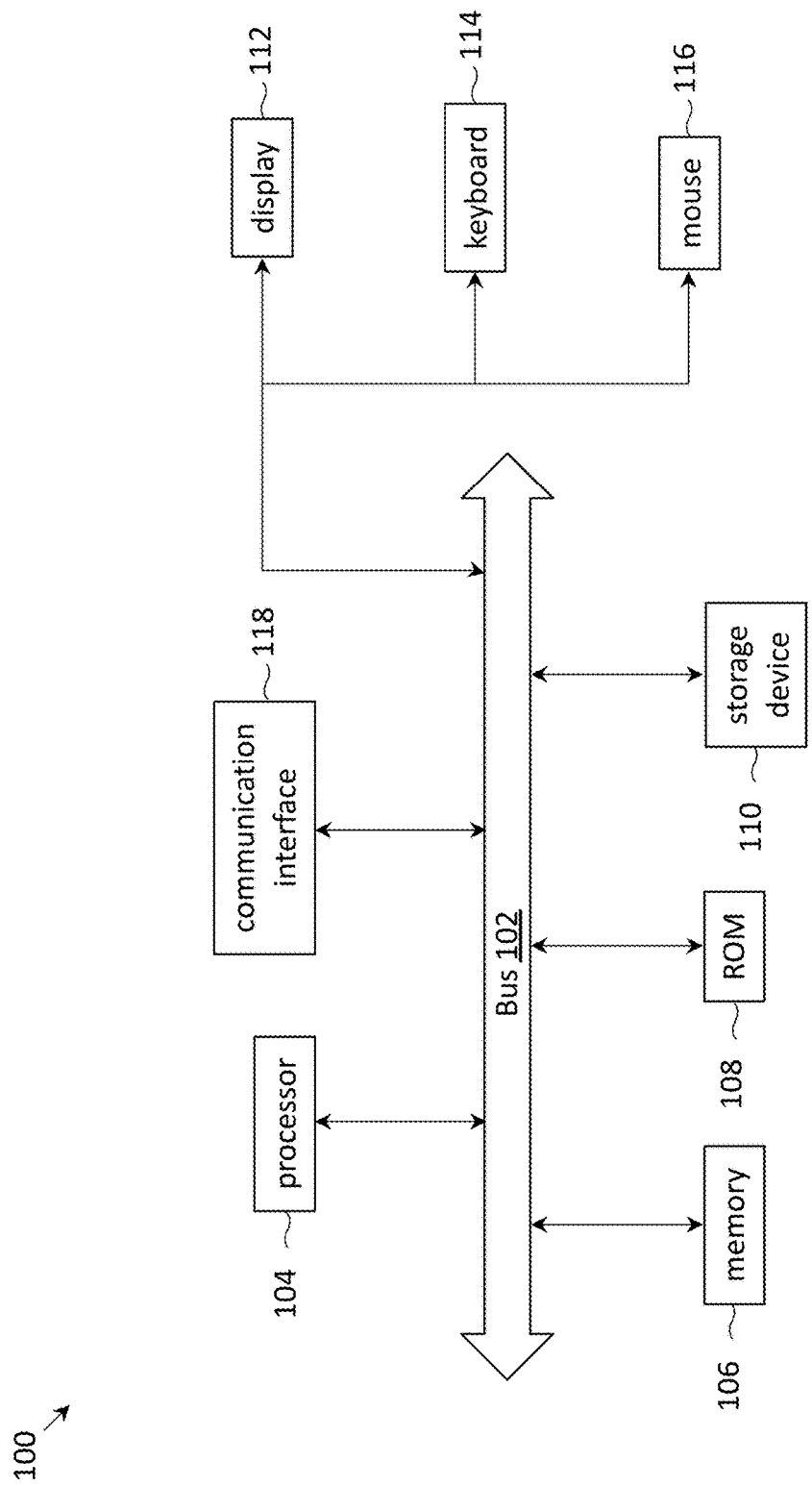
FIG. 2 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 2 provides an example of a system 100 that may be representative of any of the computing systems. Examples of system 100 may include a smartphone, a desktop, a laptop, a mainframe computer, an embedded system, etc. Note, not all of the various computer systems have all of the features of system 100. For example, certain ones of the computer systems discussed above may not include a display inasmuch as the display function may be provided by a client computer communicatively coupled to the computer system or a display function may be unnecessary. Such details are not critical to the present invention.

System 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, for example a hard disk, flash memory-based storage medium, or other storage medium from which processor 104 can read, is provided and coupled to the bus 102 for storing information and instructions (e.g., operating systems, applications programs and the like).

Computer system 100 may be coupled via the bus 102 to a display 112, such as a flat panel display, for displaying information to a computer user. An input device 114, such as a keyboard including alphanumeric and other keys, may be coupled to the bus 102 for communicating information and command selections to the processor 104. Another type of user input device is cursor control device 116, such as a mouse, a trackpad, or similar input device for communicating direction information and command selections to processor 104 and for controlling cursor movement on the display 112. Other user interface devices, such as microphones, speakers, etc. are not shown in detail but may be involved with the receipt of user input and/or presentation of output.

The processes referred to herein may be implemented by processor 104 executing appropriate sequences of computer-readable instructions contained in main memory 106. Such instructions may be read into main memory 106 from another computer-readable medium, such as storage device 110, and execution of the sequences of instructions contained in the main memory 106 causes the processor 104 to perform the associated actions. In alternative embodiments, hard-wired circuitry or firmware-controlled processing units may be used in place of or in combination with processor 104 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 100 or similar electronic computing device, that manipulates and transforms data represented as physical (electronic) quantities within its registers and memories into other data similarly represented as physical quantities within its memories or registers or other such information storage, transmission or display devices.

Computer system 100 also includes a communication interface 118 coupled to the bus 102. Communication interface 118 may provide a two-way data communication channel with a computer network, which provides connectivity to and among the various computer systems discussed above. For example, communication interface 118 may be a local area network (LAN) card to provide a data communication connection to a compatible LAN, which itself is communicatively coupled to the Internet through one or more Internet service provider networks. The precise details of such communication paths are not critical to the present invention. What is important is that computer system 100 can send and receive messages and data through the communication interface 118 and in that way communicate with hosts accessible via the Internet. It is noted that the components of system 100 may be located in a single device or located in a plurality of physically and/or geographically distributed devices.

Thus, a stateful approach for detecting API attacks by continuously monitoring state transitions and actions within an API session has been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer-implemented method for detecting stateful application programming interface (API) attacks, the method comprising:
   analyzing, based on API state detection rules, API responses to detect API states within API sessions, wherein the API state detection rules encompass endpoint universal resource locators (URLs) and data extraction pathways, thereby facilitating an extraction of metadata defining the respective API state for a corresponding user session using a set of API endpoint URLs and a set of data extraction criteria;
   extracting, based on extraction rules, one or more of session identifiers or tokens from API calls through criteria including one or more of API request headers or JavaScript Object Notation (JSON) Web Token (JWT) parameter, wherein the extraction rules include the set of data extraction criteria, including one or more of the API request headers or a JWT parameters path, followed by the metadata defining the respective API state for the corresponding user session;
   determining stateful API attacks detection rules based on the detected API states and the extracted one or more of the session identifiers or tokens; and
   continuously monitoring state transitions and actions within the API sessions based on the stateful API attacks detection rules so as to detect stateful API attacks.

2. The computer-implemented method of claim 1, wherein the metadata defining the respective API state for the corresponding user session is extracted by analyzing the API responses and matching the API responses with the API endpoint URLs and data extraction criteria of the extraction rules.

3. The computer-implemented method of claim 1, wherein the data extraction criteria include response JSON parameters paths, followed by the metadata defining the respective API state for the corresponding user session.

4. The computer-implemented method of claim 1, further comprising defining rules of extracting API sessions.

5. The computer-implemented method of claim 4, wherein the rules of extracting API sessions represent sets of formal matching and data extraction sub-rules.

6. The computer-implemented method of claim 1, wherein the stateful API attacks detection rules use API data from a plurality of states, including a first state during an authentication stage, and a second state that is entered once a session key or token has been defined.

7. The computer-implemented method of claim 6, wherein a first rule is used to extract the API data during the first state, and a second rule is used to extract the API data during the second state.

8. The computer-implemented method of claim 7, wherein the first or second rule involves an extraction of item identifiers allowed to a current API session.

9. The computer-implemented method of claim 1, wherein the stateful API attacks detection rules include a first rule configured to detect and prevent unauthorized access to administrative endpoints in an API.

10. The computer-implemented method of claim 9, wherein the first rule examines a role of a user associated with a current session before allowing the user access to sensitive endpoints.

11. The computer-implemented method of claim 1, wherein the stateful API attacks detection rules include a first rule ensuring that each API request is checked against allowed object identifiers for an authenticated user.

12. The computer-implemented method of claim 1, wherein extraction rules and stateful API attacks detection rules are generated by a large language model (LLM) by the LLM learning natural language descriptions of API states, session behaviors and attack scenarios.

13. The computer-implemented method of claim 1, further comprising using a large language model (LLM) to continuously analyze logs of detected attacks, false positives and legitimate traffic so as to refine the extraction rules and the stateful API attacks detection rules.

14. The computer-implemented method of claim 1, further comprising:
monitoring API traffic in real-time so as to identify new patterns and anomalies; and
refining the extraction rules and the stateful API attacks detection rules based on the identified new patterns and anomalies.

15. The computer-implemented method of claim 1, further comprising:
collecting feedback from users and security teams regarding false positives and missed detections; and
refining the extraction rules and the stateful API attacks detection rules based on the collected feedback.

16. The computer-implemented method of claim 1, wherein the API state detection rules include a first rule to identify whether or not a user is authenticated by specifying an expected response structure from an authentication endpoint.

17. The computer-implemented method of claim 1, wherein the extraction rules include a session extraction rule to pull Open Authorization (OAuth) tokens from the API request headers.

18. A non-transitory computer-readable medium comprising instructions that, when executed by a processor, cause the processor to:
analyze, based on API state detection rules, API responses to detect API states within API sessions, wherein the API state detection rules encompass endpoint universal resource locators (URLs) and data extraction pathways, thereby facilitating an extraction of metadata defining the respective API state for a corresponding user session using a set of API endpoint URLs and a set of data extraction criteria;
extract, based on extraction rules, one or more of session identifiers or tokens from API calls through criteria including one or more of API request headers or JavaScript Object Notation (JSON) Web Token (JWT) parameters, wherein the extraction rules include the set of data extraction criteria, including one or more of the API request headers or a JWT parameters path, followed by the metadata defining the respective API state for the corresponding user session;
determine stateful API attacks detection rules based on the detected API states and the extracted one or more of the session identifiers or tokens; and
continuously monitor the state transitions and actions within the API sessions based on the stateful API attacks detection rules so as to detect stateful API attacks.

* * * * *